No. 755,649. PATENTED MAR. 29, 1904.
W. G. GEIER.
CAMERA SUPPORT.
APPLICATION FILED JAN. 26, 1904.
NO MODEL.
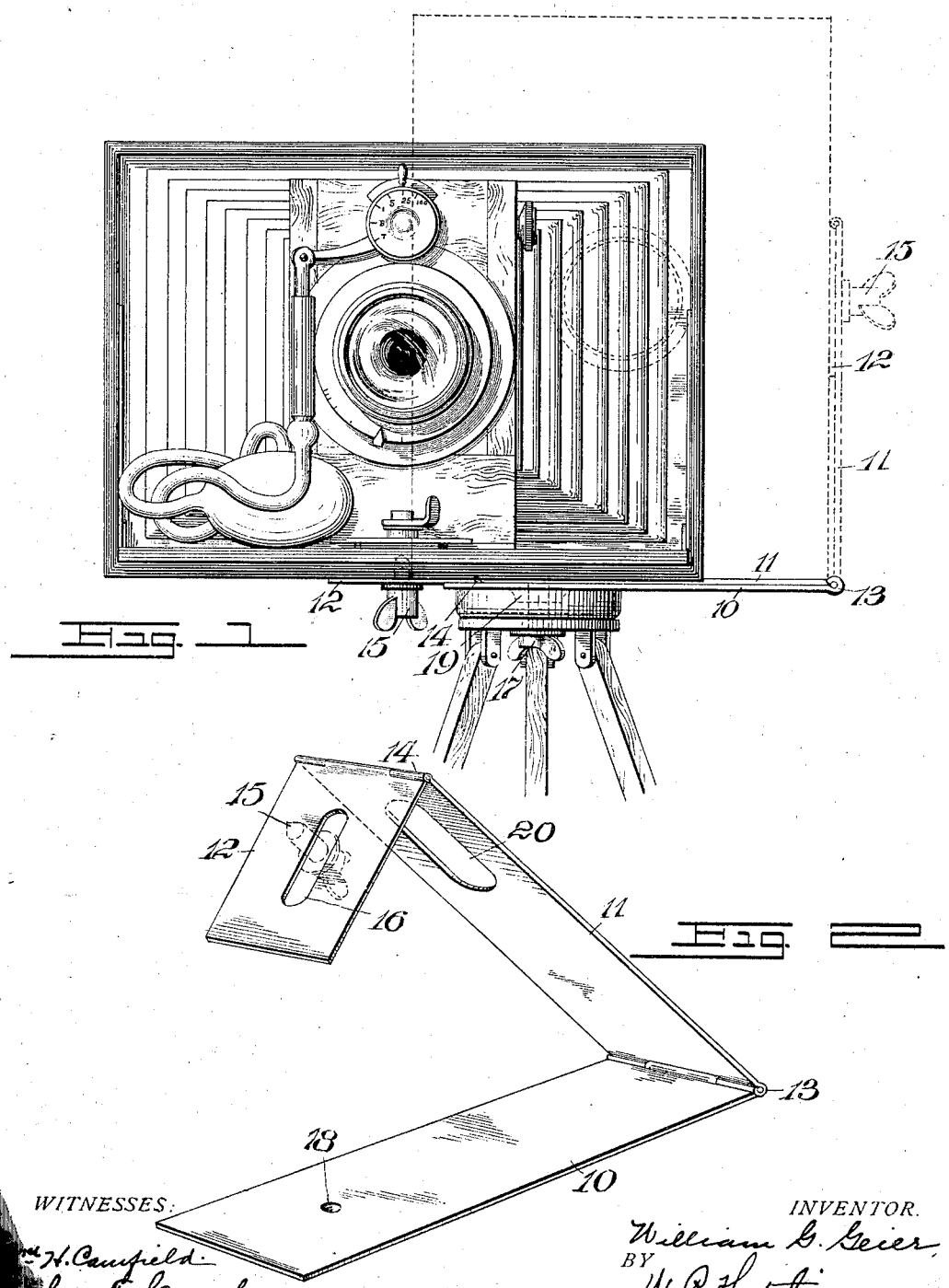
WITNESSES:
INVENTOR.
William G. Geier,
BY
W. P. Hutchinson.
ATTORNEY.

No. 755,649. Patented March 29, 1904.

UNITED STATES PATENT OFFICE.

WILLIAM G. GEIER, OF NEW YORK, N. Y.

CAMERA-SUPPORT.

SPECIFICATION forming part of Letters Patent No. 755,649, dated March 29, 1904.

Application filed January 26, 1904. Serial No. 190,664. (No model.)

*To all whom it may concern:*

Be it known that I, WILLIAM G. GEIER, of New York, in the county of Queens and State of New York, have invented a new and Improved Camera-Support, of which the following is a full, clear, and exact description.

This invention relates to a support that is to be placed on the tripod and to receive the camera, and is also arranged so that the camera can be turned so as to assume a position at right angles to the normal position.

A further object is to provide a device of this kind by means of which the camera can be turned without detaching it from the apparatus and at the same time without interference with the horizontal swiveling motion of the tripod.

In cameras as now constructed they are secured to the tripod by means of holes arranged in two sides of the camera, and the camera is thus directly attached to the tripod and cannot be changed from one position to another without detaching it. This has been overcome in some instances by making a camera in which the plate-holder at the back is swiveled so as to be turned; but this necessitates a square camera, the dimensions in both directions being slightly in excess to the long side of the plate, thus making a bulky arrangement.

Reference is to be had to the accompanying drawings, forming a part of this specification, in which similar figures of reference indicate corresponding parts in both the views.

Figure 1 is a face view of a camera attached to a tripod, the adjustable support being interposed between the tripod and the camera; and Fig. 2 is a perspective view of the support detached.

The support consists, essentially, of a leaf 10, a leaf 11, and a leaf 12, being hinged, respectively, at 13 and 14. When the leaves 10 and 11 are placed flat, as shown in full lines in Fig. 1, the leaf 12 extends beyond the forward end of the leaf 10, and the camera is secured by means of a screw 15, as shown in Fig. 1, this screw passing through a slot 16 in the leaf 12 to provide a lateral adjustment of the camera.

The support is secured on the tripod by means of a screw 17, that fits into a screw-threaded perforation 18 in the leaf 10, the leaf being preferably reinforced at this point by a boss 19 to give the screw more purchase. This arrangement so disposes the camera as to make the long side of the plate horizontal, and when it is desired to turn the camera to arrange it upright the camera is lifted and turned so as to bring the leaf 12 up against the leaf 11, this leaf 11 having in the meantime become perpendicular, as shown in Fig. 1 in dotted outline. The leaf 11 is provided with a slot 20, that allows the head of the screw 15 to pass through it to assume this perpendicular position, and at the same time this slot 20, when the leaves 10 and 11 are together, provides a little space if the end of the screw 19 should project slightly above the leaf 10. It is obvious that the shape and general outline of the different parts might be materially changed to secure a light or a more ornamental design without departing from the scope of the invention.

It will be apparent that I have devised a camera-support that can be folded up flat and easily carried in the pocket or in the camera-case and one that when it is placed in use permits of the right-angled positions of a camera on a tripod or other support quickly and without detaching the camera in any way.

Having thus fully described my invention, I claim as new and desire to secure by Letters Patent—

1. A camera-support, comprising a pair of leaves pivotally attached to one another at one end, means on one leaf for securing it to a support, and means on the free end of the other leaf for pivotally supporting a camera.

2. A camera-support, comprising a pair of leaves hinged together at one end, means for attaching one of the leaves to a support, and means pivotally arranged on the free end of the second leaf to adjustably hold a camera.

3. A camera-support, comprising a pair of leaves hinged together at one end, one leaf having means for attaching it to a support, the second leaf having a short leaf pivotally attached to its other end, the short leaf being arranged to secure a camera.

4. A camera-support, comprising a leaf having means for attaching it to a support and having a hinge on one end, a second shorter leaf hinged to the first leaf and having a slot therein, a slotted third leaf pivotally secured to the other end of the second leaf, so that when the first and second leaves lie flat together, the third leaf projects beyond and rests partly on the first leaf, and means for attaching a camera to the third leaf through the slot.

5. The combination, of a camera-support, comprising a leaf pivotally attached to a second shorter leaf on one end, the second leaf having a slot, and a third leaf secured to the other end of the second leaf and having a slot, with a camera, adapted to be secured to the third leaf, and a screw connecting with the camera and passing through the slot, the slot in the second leaf allowing the passage of the camera-securing screw when the support is tilted to hold the camera perpendicular.

WILLIAM G. GEIER.

Witnesses:
WM. H. CAMFIELD,
J. G. DUNBAR.